Jan. 26, 1943. W. E. BURR 2,309,301
SPECTRAL ANALYSIS
Filed Dec. 4, 1939
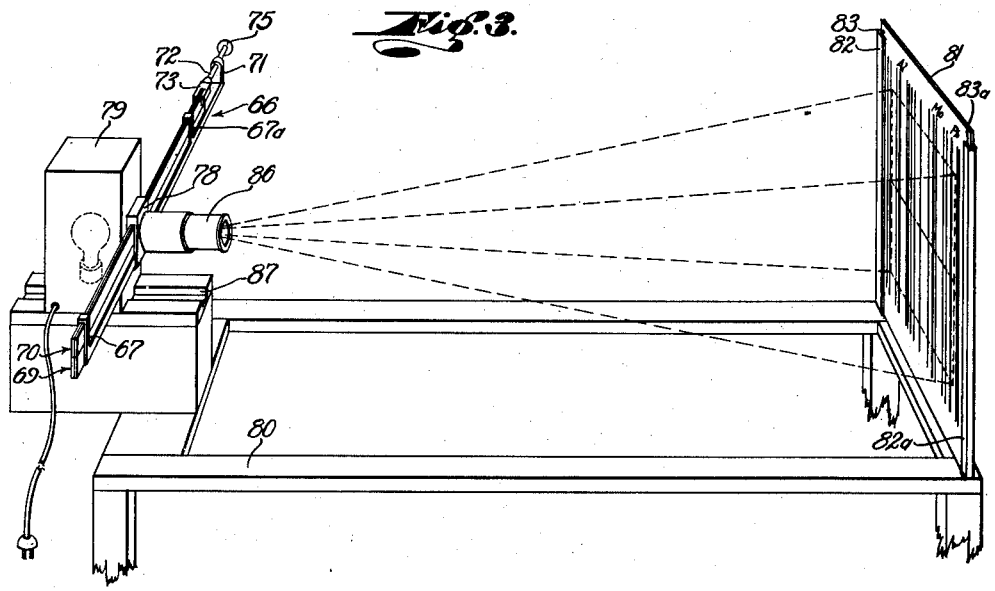
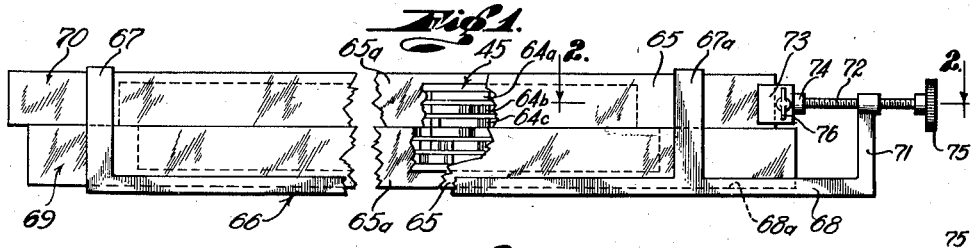
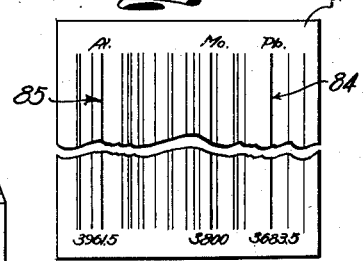
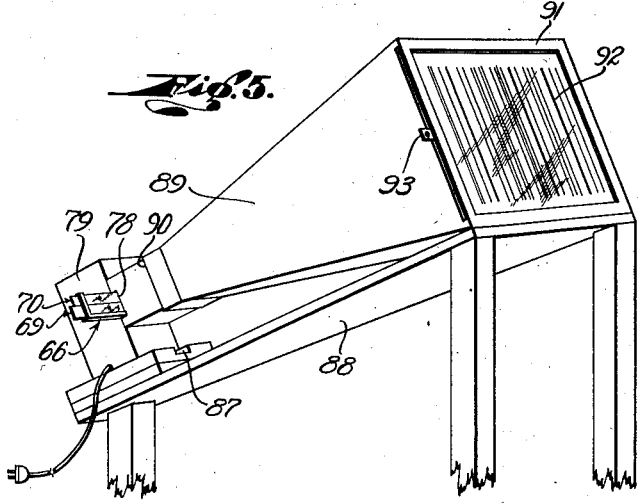
Inventor
WAYNE E. BURR
H. Calvin White
Attorney Patented Jan. 26, 1943

2,309,301

UNITED STATES PATENT OFFICE 2,309,301

SPECTRAL ANALYSIS

Wayne E. Burr, Hermosa Beach, Calif., assignor of one-half to Donald L. Porter, Los Angeles, Calif.

Application December 4, 1939, Serial No. 307,489

12 Claims. (Cl. 88—14)

This invention has to do generally with the art of spectrography, and relates particularly to improved methods of analyzing the record from a spectrograph.

One of the primary objects of my invention is to provide a system of spectrography wherein the data are secured by comparison between an "artificial spectrum" and a magnified image of the record of the spectrograph which image may have dimensions such that part or all of the visible spectrum may be represented by several feet of length in the magnified image. The use of this method makes possible a system whereby the presence and identity of lines of the spectrum are simultaneously ascertained without necessity for direct determination of the position of the lines in the spectrum by linear measurements.

Thus, I provide a system of spectrography whereby the data are secured from an artificially produced spectrum which is effectively of great length (e. g., 6000 Angstrom units extended over 30 feet) but the elements of the apparatus employed are of types ordinarily adapted to only give satisfactory intensities and definition at much smaller total dispersions. That is to say, I use relatively small and inexpensive apparatus and still am able to read my data from a spectrum of a magnitude which was heretofore only obtainable through the use of very elaborate, precise and expensive equipment. In actual practice my invention provides a system of spectrography whereby a minimum of time is required to analyze a spectrogram of an unknown substance and obtain complete data from the record as to the identity of the constituents of the substance. The total time required for such a complete determination is far less than has been possible with previously known equipment and methods.

The present system is applicable to many uses in the field of general spectrography and is particularly well adapted to both the qualitative and quantitative chemical analyses of unknown substances. The record obtained and the method of analysis of the record are especially useful for demonstration purposes such as for illustration in teaching the subject of spectrography as well as for purposes of providing evidence as to the identity of unknown substances.

The invention may best be illustrated by the following description of a particular though typical embodiment which is adapted to the analysis of substances by means of data secured from the emission spectra of such substances. Reference is had throughout the description to the accompanying drawing, in which:

Fig. 1 illustrates a frame for use in analyzing spectrograms and making the adjustments involved in obtaining data from such records;

Fig. 2 is a section on line 2—2 of Fig. 1;

Fig. 3 shows a combination of apparatus including that of Fig. 1, employed for the purpose of analyzing spectrograms;

Fig. 4 presents an enlarged view of the reference chart or "artificial spectrum," and Fig. 5 illustrates a variational form of apparatus generally similar in purpose to the combination of Fig. 3.

In Fig. 1, I have generally indicated at 45 a photographic record of the spectrogram of an unknown substance to be analyzed, the specific form of spectrographic record chosen for illustration consisting of a photographic film, for example standard 35 mm. moving picture film of approximately 30 inches in length, carrying the spectrogram record as a photographic negative. The record, e. g., 64a, appears on the film as a band, the width of which may be sufficiently narrow to permit additional spectrograms 64b and 64c of the same or other unknowns, to be carried by the same film. As illustrated in Figs. 1 and 2, the film is mounted between two strips of glass 65 and 65a.

Frame 66 of Fig. 1 is arranged so that the glass strips with the mounted film (hereinafter called "slides") may be placed in position in slots provided in the vertical members 67 and 67a and slot 68a in the base 68. The frame is of such dimensions as to hold two slides, directly adjacent and one above the other. The lower slide 69 is normally fixed with respect to frame 66 and the upper slide 70 is allowed to have motion in a lengthwise direction with respect to lower slide 69. Frame 66 is provided at one end with a threaded arm 71 carrying a screw 72 which is attached to a clamp 73 by means of swivel joint 74. A hand wheel or knob at 75 provides means for turning screw 72 and hence accurately and smoothly adjusting the position of slide 70 with respect to slide 69. Fig. 2 shows the clamp 73 gripping slide 70 and provided with a thumb screw 76. In order to avoid damage to the slide, a cushioning material such as felt or cork may be inserted at 77.

Frame 66 is mounted in slide holder 78 of projector 79, see Fig. 3, which is supported at one end of a frame 80 having a vertically mounted screen 81 at the opposite end. The screen is removably supported in an upright position within slits 83 and 83a in columns 82 and 82a. Screen 81, which may be defined as an "artificial spectrum," is constructed by placing lines representing known lines of the spectrum on an opaque surface and spacing said lines to scale with respect to each other by reference to standard tables of wave lengths for spectral lines of the elements. For example, at 84 is shown a principal line for the element lead at a wave length of 3683.5 Angstrom units, and at 85 is shown a principal line of the element aluminum at 3961.5 Angstrom units. This artificial spectrum may conveniently be in the nature of a printed card. A number of cards are provided, each one having a small section (e. g., 300 Angstrom units) of the spectrum included upon it, with the lines indicated which appear in that particular section. When it is desired to analyze a particular section of the spectrum, the proper chart or screen is placed in columns 82 and 82a and images of the records on the films mounted in frame 66 are projected onto screen 81 and focused thereon by adjustment of the optical system 86 of projector 79.

The distribution of lines on screen 81 is made to align with the dispersion of the spectrum on the film through the use of what is called a "master film." Generally this master film is the film of lower slide 69. This film is obtained by recording thereon the spectra of known chemical elements, the characteristic principal lines of which are readily located and identified. For example, substances containing the elements lead, aluminum and calcium may be placed in the arc and their spectra recorded upon a film either individually or in a mixture. After this film is developed, the characteristic principal lines of each element may be located and marked on the film with the symbol of the corresponding element. This may usually be accomplished, by one familiar with such records, merely through an inspection of the film whereby certain characteristic groupings of the lines of the known elements are easily recognized. Their wave lengths may be readily secured from well known standard tables of such data and also indicated on the film as desired. An alternate method which may be required under some circumstances would be to identify these lines and their wave lengths by means of direct linear measurement of their relative positions on the record, using a measuring microscope or optical comparator and referring all lines to the standard lines such as the well known D lines of sodium.

After having obtained such a master film with known lines marked and wave lengths indicated throughout its length, one may readily align the "artificial spectra," or charts, with the film. For example if the chart 81 of Fig. 4 is serving as the screen in Fig. 3, the image of the corresponding portion of the spectrum of the master film in slide 69 is projected upon the screen. The line corresponding to the line for aluminum at 3971.5 Angstrom units on the film is brought into coincidence with the corresponding line on the screen by sliding the frame 66 into proper position in the slide holder 78 of projector 79. While maintaining these lines in coincidence, the distance between the projector and screen 81 is varied by sliding the projector in way 87 until a second line, such as that for the element lead at 3693.5 Angstrom units, is also brought into coincidence. The optical system 86 of projector 79 must also be adjusted to focus the image sharply on the screen at this point of the procedure. The projector and screen now are so adjusted with respect to each other that the projector is effectively casting an image on the screen which corresponds to the size of spectrum which would have been produced if the spectrum, as it emerged from the spectrograph, had been observed at a point where the total dispersion corresponded to that of the chart (e. g., 30 feet). After the above described adjustment is made, a record from an unknown substance may be projected on the screen and its lines compared with those on the chart.

I have found that, for convenience in aligning an unknown film with the charts a spectrum of the element iron may be included on the unknown film. Therefore, I may provide a spectrum of iron on each film, say as upper spectrum 64 of Fig. 1, by burning a sample of iron in the arc before unknowns are recorded, on the same film. There are three advantages to this procedure which are:

1. The element iron yields a spectrum having several well defined and easily recognized groups of spectral lines.

2. The groups of lines are distributed over a wide range of the spectrum and provide references for a large number of charts.

3. In view of the facts that iron occurs in most unknowns and that the lines are numerous and intense it is bothersome because lines from iron tend to obscure those from other elements. By having the iron spectrum immediately adjacent to an unknown spectrum the lines produced by iron are immediately eliminated from the unknown spectrum by direct comparison in the image from the one film.

The record of an unknown substance may conveniently be the film of upper slide 70. In this case the record of the unknown, which is the film of slide 70, is constantly adjacent to the known record of the master film in lower slide 69, and images of both records may be projected on screen 81 so that there is opportunity for continuous reference to the master film.

The procedure for analysis of the spectrum of an unknown substance is as follows. After mounting the film obtained from the spectrograph between glass strips it is inserted in frame 66 in the position of slide 70 and the master film is put into place as slide 69. The frame 66 is then placed in slide holder 78 of projector 79 and a chart inserted as a screen at 81 in the vertical members 82 and 82a. Frame 66 is moved through slide holder 78 until that portion of the master film (slide 69) which corresponds to the chart used as screen 81 has its image projected on the screen. Known lines of the master film are aligned with corresponding lines of the chart of screen 81 in the manner described above. The film for the unknown (slide 70) is adjusted with respect to the master film by turning knob 75 until its image on screen 81 represents the same portion of the spectrum as does the image of the master film. Observations may then be taken to determine which lines of the chart of screen 81 appear in the image of the film of slide 70. Readings taken at the top of the chart indicate the elements which produce the lines found and their wave-lengths may be taken from the bottom of the chart. After all observations are taken in the section of the film which is included in the first chart selected, the next chart in order is placed at screen 81. The procedure described above is repeated on this and all successive charts until the entire spectrum is covered.

In most cases it is not necessary for one who is familiar with these records to follow through the step of aligning the chart with the master film. Practically all unknown substances will contain certain well known elements whose lines are readily recognized on the record. For example, sodium is practically always present in substances of mineral nature, iron in metals, calcium in salt from water etc. The well known lines of these elements may be recognized at once by the operator and he may use them, as they appear on the record of the unknown, as references for aligning the charts.

A convenient feature which may be incorporated in my reference charts or "artificial spectra" is that of indicating wave lengths at definite numerical intervals across the spectrum. For example, I may include lines on the charts which are located at intervals of 200 Angstrom units throughout the entire spectrum. This feature of the charts allows them to be simplified to a considerable extent since it is then possible to provide charts having a minimum of lines representing the most common lines of elements usually dealt with in analyses. The more uncommon or less persistent lines of some of the elements may be eliminated from the charts. Any line appearing on the image and for which there is no corresponding line on the chart, can be easily identified by measuring the distance between it and the nearest 200 Angstrom units line, calculating its wave length and referring to a table of standard wave lengths. Such measurements may be satisfactorily made with an ordinary engineer's scale.

Fig. 5 is illustrative of alternate apparatus for the analysis of spectrograms which is characterized by the use of a translucent screen rather than an opaque screen. Base 88 carries a projector 79 at one end, projector 79 being provided with a slide holder 78 to carry the frame 66. Projector 79 is connected to a housing 89 through a sliding joint 90. Housing 89 terminates in a slotted frame 91 which is so constructed that screen 92 may be inserted into or removed from frame 91, for example, by means of the grip shown at 93. Projector 79 is provided with means 87 for varying the distance between projector 79 and screen 92. In this apparatus screen 92 is a translucent medium such as ground glass, for example. Upon its upper surface screen 92 has indicated an "artificial spectrum" in the same manner as is the case for the opaque screen 81 shown in Fig. 4. This apparatus is operated in the same manner as the apparatus shown in Fig. 3 except that the operator views the image through screen 92 and compares the lines of said image with the reference lines indicated on the side of the screen which is toward the operator. Frame 91 is mounted perpendicularly to base 88 and the latter is tilted so as to place screen 92 at an angle which is convenient for viewing the image.

When charts are changed so as to secure data from another portion of the spectrum it is necessary to make a slight adjustment in the alignment because of the fact that the spectrum on the film is originally recorded on an arc of a circle and is projected from a plane surface onto another plane surface. This adjustment is readily made in proceeding from one chart to another because certain lines may be made common to successive charts and, with the aid of known lines appearing in the spectrum, the adjustment may be made as described above. Such an adjustment is a small one, in going from one chart to the next in order, and it is rapidly accomplished by making a slight adjustment of the distance between the projector and the screen.

The ease with which the above mentioned adjustment may be made emphasizes one of the principal advantages of my method of analyzing spectrograms. Since I am able to project only a small portion (e. g. 0.75 inch) of the spectrum at one time and align it with a corresponding "artificial spectrum" of permanent nature I automatically compensate for deviation from true dispersion which would arise when a film exposed on an arc is projected as a plane record onto a plane surface. As long as the charts are constructed upon a stable medium which will not change dimensions with age I have a permanent reference which provides means for automatic compensation for this deviation from the true dispersion over the length of the spectrum. The length of the film projected as one image is so small that any deviation which does occur is not appreciable for all practical purposes in the analysis of spectrograms. It will also be readily seen that this method automatically compensates for any length changes which may take place in the film either during processing or in such cases as where a film is re-analyzed after long storage periods during which it may expand or contract.

The invention is not necessarily confined to use with spectrograms produced by any particular spectrograph. I may prepare charts of "artificial spectra" and master films for use with spectrographs employing various diffraction media such as diffraction gratings, plane reflection gratings, transmission gratings and prisms. I may also prepare charts and master films for use in the analysis of X-ray spectrograms such as those which are obtained when the powder method of diffraction is used. In this case the "artificial spectrum" and the master film are records of spectral lines which are characteristic of chemical compounds. In any case, after the necessary "artificial spectra" and master films are obtained from any type of spectrograph I may employ the apparatus and method as described above to secure the desired data from the record, by projecting an image of the record on a reference screen and directly determining the presence and relative densities of lines of the spectrum which are present in the record.

I claim:

1. For the purpose of analyzing spectrograms, an apparatus comprising an optical projector capable of producing an image of the spectrogram, means providing a surface upon which an image of said spectrogram is received and upon which is indicated the relative positions of predetermined spectral lines, and means for varying the distance between said projector and said surface to bring lines of said image into coincidence with said predetermined spectral lines indicated on said surface.

2. For the purpose of analyzing spectrograms, an apparatus comprising an optical projector capable of producing an image of the spectrogram, an adjustable mounting for said spectrogram movable relative to said projector, means providing a surface upon which an image of said spectrogram is received and upon which is indicated the relative positions of predetermined spectral lines, and means for varying the distance between said projector and said surface to bring lines of said image into coincidence with said predetermined spectral lines indicated on said surface.

3. For the purpose of analyzing spectrograms, an apparatus comprising an optical projector capable of producing an enlarged image of said spectrograms, a carriage for said spectrograms adapted to carry two adjacent elongated but not superimposed spectrograms in the same plane, means for moving one of said spectrograms longitudinally with respect to the other and in the plane of said spectrograms, means providing an opaque surface on which the image of said spectrograms is received, said surface having indicated thereon spectral lines of predetermined positions and spacings, and means for bringing lines of said spectrogram images into coincidence with said spectral lines on said surface.

4. The method for analyzing a characteristic spectrum of a substance from a record of the spectrum that includes producing an enlarged image of said record, superimposing said image upon a reference record of known spectral lines some of which correspond to spectral lines in said record but are spaced apart on relatively enlarged scale, controlling the enlargement of the image on said reference record to bring into coincidence different but corresponding spectral lines of both the image and reference record, and comparing the spectrum of the image with the lines of the reference record to ascertain the identity of the chemical constituents of the substance being analyzed.

5. The method of analyzing a characteristic spectrum of a substance which comprises projecting a greatly enlarged image of a spectral record obtained from the substance being analyzed upon a surface having indicated thereon predetermined spectral lines spaced apart on enlarged scale as compared with corresponding lines on said record, controlling the enlargement of the image on said surface to bring different spectral lines of the image into coincidence with different but corresponding spectral lines indicated on said surface, and comparing the spectral lines in said image with the lines on said surface to ascertain the identity of the chemical constituents of the substance being analyzed.

6. The method of analyzing the spectral emission from a substance, which comprises making a photographic record of the spectral lines emitted by the constituent chemical elements of said substance, projecting an enlarged image of said record upon a surface which has indicated thereon the relative positions of known spectral lines of chemical elements, controlling the enlargement of the image on said surface to bring spectral lines of said image into coincidence with corresponding lines indicated on said surface, and thereby ascertaining the identity of the chemical elements of the substance being analyzed.

7. The method of analyzing the spectral emission from a substance which comprises making a record upon a light sensitive medium of the spectral lines emitted by the constituent chemical elements of said substance, producing a greatly enlarged image of a small portion only of said record, projecting said image upon a surface which has indicated thereon at large scale the relative positions of known spectral lines of chemical elements controlling the enlargement of the image on said surface to bring different spectral lines of the image into coincidence with different but corresponding spectral lines indicated on said surface, and ascertaining, by comparison of said lines with those appearing in the projected image, the identity of the chemical elements of the substances being analyzed.

8. The method of analyzing the spectral emission from a substance which comprises recording the spectral lines emitted by its constituent chemical elements upon a light sensitive photographic film, developing said film to fix the record thereon as a photographic negative, projecting a greatly enlarged image of a small portion only of said record on a surface which has indicated thereon at large scale the relative positions of known spectral lines of chemical elements controlling the enlargement of the image on said surface to bring different spectral lines of the image into coincidence with different but corresponding spectral lines indicated on said surface, and ascertaining, by comparison of said lines with those appearing in the projected image, the identity of the chemical elements of the substance being analyzed.

9. The method of analyzing the spectral emission from a substance which comprises recording the spectral lines emitted by its constituent chemical elements upon a light sensitive photographic film, developing said film to fix the record thereon as a photographic negative, projecting a greatly enlarged image of a small portion only of said record on an opaque surface which has indicated thereon at large scale the relative positions of known spectral lines within a limited portion of the spectrum, controlling the enlargement of the image on said surface to bring different spectral lines of the image into coincidence with different but corresponding spectral lines indicated on said surface, and ascertaining by comparison of said lines with those appearing in the projected image, the identity of the chemical elements of the substance being analyzed.

10. The method of analyzing the spectral emission from a substance which comprises recording the spectral lines emitted by its constituent chemical elements upon a light sensitive photographic film, developing said film to fix the record thereon as a photographic negative, projecting a greatly enlarged image of a small portion only of said record on a translucent surface which has indicated thereon at large scale the relative positions of known spectral lines within a limited portion of the spectrum, controlling the enlargement of the image on said surface to bring different spectral lines of the image into coincidence with different but corresponding spectral lines indicated on said surface, and ascertaining by comparison of said lines with those appearing in the projected image, the identity of the chemical elements of the substance being analyzed.

11. The method of analyzing the spectral emission from a substance, which comprises preparing a plurality of charts having large scale showings of the spectral lines of different portions of the chemical element spectrum, recording the spectral lines emitted by the constituent chemical elements of said substance, projecting an enlarged image of a portion of said record upon one of said charts having spectral lines within the range of the lines of the image, controlling the enlargement of the image on the chart to bring different spectral lines of the image into coincidence with corresponding lines shown on the chart, and ascertaining by comparison of the lines of said projected image and the lines on the chart, the identity of the chemical elements of the substance being analyzed having spectral lines within the range of the chart on which the image is projected.

12. The method of analyzing the spectral emission from a substance, which comprises preparing a plurality of charts having large scale showings of the spectral lines of different portions of the chemical element spectrum, recording the spectral lines emitted by the constituent chemical elements of said substance, projecting an enlarged image of a portion of said record upon one of said charts having spectral lines within the range of the lines of the image, controlling the enlargement of the image on the chart to bring different spectral lines of the image into coincidence with corresponding lines shown on the chart, and ascertaining by comparison of the lines of said projected image and the lines on the chart, the identity of the chemical elements of the substance being analyzed having spectral lines within the range of the chart on which the image is projected, and then projecting an enlarged image of another portion of said record upon another of said charts to similarly identify elements having corresponding lines appearing in the image and on the chart.

WAYNE E. BURR.